(12) United States Patent
Ackley

(10) Patent No.: US 10,275,618 B2
(45) Date of Patent: *Apr. 30, 2019

(54) FINDING SENSOR DATA IN AN RFID NETWORK

(71) Applicant: INTERMEC IP CORP., Everett, WA (US)

(72) Inventor: H. Sprague Ackley, Seattle, WA (US)

(73) Assignee: INTERMEC IP CORP., Everett, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/462,003

(22) Filed: Aug. 18, 2014

(65) Prior Publication Data

US 2014/0354412 A1 Dec. 4, 2014

Related U.S. Application Data

(63) Continuation of application No. 12/619,228, filed on Nov. 16, 2009, now Pat. No. 8,810,369.

(60) Provisional application No. 61/116,154, filed on Nov. 19, 2008.

(51) Int. Cl.
*G06K 7/10* (2006.01)
*H04Q 9/00* (2006.01)
*G08C 17/02* (2006.01)

(52) U.S. Cl.
CPC ......... *G06K 7/10366* (2013.01); *G08C 17/02* (2013.01); *H04Q 9/00* (2013.01); *H04Q 2209/47* (2013.01); *H04Q 2209/75* (2013.01)

(58) Field of Classification Search
CPC .. G06K 7/10366; H04Q 2209/75; H04Q 9/00; H04Q 2209/47; G08C 17/02

USPC ............ 340/10.1, 10.2, 572.1; 235/375, 385, 235/435, 440, 454, 470, 449, 462.01, 235/462.13

See application file for complete search history.

(56) References Cited

U.S. PATENT DOCUMENTS

| | | |
|---|---|---|
| 6,321,986 B1 | 11/2001 | Ackley |
| 6,677,852 B1 | 1/2004 | Landt |
| 6,720,866 B1 * | 4/2004 | Sorrells ............. G06K 19/0717 340/10.34 |
| 2004/0025035 A1 | 2/2004 | Jean-Claude et al. |
| 2005/0092823 A1 * | 5/2005 | Lupoli ................... G06Q 10/08 235/375 |
| 2006/0187031 A1 * | 8/2006 | Moretti .................. G06Q 10/08 340/539.22 |
| 2007/0276985 A1 * | 11/2007 | Schuessler ........... G06K 7/0008 711/100 |
| 2008/0011822 A1 | 1/2008 | Ackley et al. |

(Continued)

*Primary Examiner* — An T Nguyen
(74) *Attorney, Agent, or Firm* — Oliff PLC; R. Brian Drozd

(57) ABSTRACT

A system and method of selectively reading sensor data from a memory device is able to search the memory device for an indicator that identifies the sensor data, and read only the sensor data identified by the indicator from the memory device. In this way, interrogating devices are able to sort through sensor data stored in a network of memory devices, such as an RFID network, and report specific data of interest despite the existence of a variety of data types in the network. In some embodiments, flags are stored and associated with specific types of data, such as various sensor data, thereby allowing numerous memory devices and sensors to operate and be read efficiently in the same environment.

22 Claims, 3 Drawing Sheets

(56) References Cited

U.S. PATENT DOCUMENTS

2008/0030330 A1    2/2008  Vock et al.
2010/0090809 A1*  4/2010  Yeo .................... G06K 19/0717
                                                      340/10.41

* cited by examiner

[RFID_tag_ID]
[Flag_1.1]
[Time_1] (optional)
[Data_from_sensor_1]
[Flag_1.2]
[Time_2] (optional)
[Data_from_sensor_1]
[Flag_2.1]
[Time_2] (optional)
[Data_from_sensor_2]
. . .

FIG. 2

FINDING SENSOR DATA IN AN RFID NETWORK

CROSS-REFERENCE TO RELATED APPLICATION(S)

This application claims the benefit of U.S. patent application Ser. No. 12/619,228, filed on Nov. 19, 2009 and titled "FINDING SENSOR DATA IN AN RFID NETWORK," and claims the benefit of U.S. Provisional Application No. 61/116,154 filed Nov. 19, 2008 and titled "FINDING SENSOR DATA IN AN RFID NETWORK" by H. S. Ackley.

INCORPORATION BY REFERENCE

U.S. patent application Ser. No. 12/619,228 and U.S. Provisional Application No. 61/116,154 are hereby incorporated by reference herein in their entireties.

BACKGROUND

The present invention relates to acquisition of data from RFID tags, and more specifically to a direct and efficient method of sorting through data stored in RFID tags to acquire and/or act on desired types of data, such as stored sensor data, among many different types of data available.

In many modern applications, data associated with an item, location, or both is stored in a local memory device such as a radio frequency identification (RFID) tag, so that the stored data may be accessed by a memory reader for various purposes. According to existing methods, an interrogating device reads all data associated with a memory device being interrogated, regardless of its type, and through appropriate software the acquired data is analyzed and sorted to extract the data that matches the type of data that the interrogating device was looking for. These methods do not provide the capability to selectively acquire only data of the type that is needed, which results in a waste of time and other resources in the process of acquiring data from memory devices.

SUMMARY

A system and method of selectively reading sensor data from a memory device is able to search the memory device for an indicator that identifies the sensor data, and read only the sensor data identified by the indicator from the memory device. In this way, interrogating devices are able to sort through sensor data stored in a network of memory devices, such as an RFID network, and report specific data of interest despite the existence of a variety of data types in the network. In some embodiments, flags are stored and associated with specific types of data, such as various sensor data, thereby allowing numerous memory devices and sensors to operate and be read efficiently in the same environment.

BRIEF DESCRIPTION OF THE DRAWINGS

FIG. 2 is a diagram illustrating an exemplary embodiment of the layout of flags and data from various sensors in an RFID tag.

DETAILED DESCRIPTION

Figure 1:
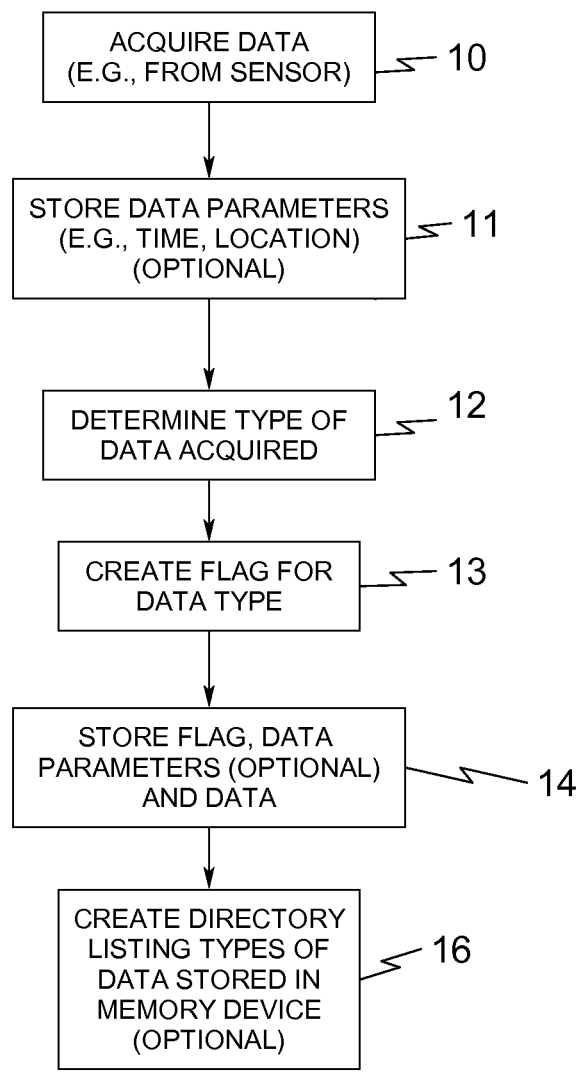
FIG. 1 is a flow diagram illustrating a method of storing data in a memory device that allows selective acquisition by data type.

FIG. 1 is a flow diagram illustrating a method of storing data in a memory device that allows selective reading of data by data type. Initially, data is acquired (step 10) by one of a number of possible methods. For example, data may be acquired by operation of a sensor that records signals related to a physical parameter of some kind, such as temperature, humidity, or others, or may be acquired by input from a user interface device, a transmission from a programming device, or by any of a number of other means. Certain data parameters may optionally also be acquired with the data (step 11), such as time, location, warning information such as a hazardous material warning, or other parameters related to the data acquired. Next, the type of data acquired is determined (step 12). The type of data may be determined by receiving an indicator flag of some sort along with the data when it is acquired, by reading a header received before the data is acquired that indicates what type of data will follow, by examining the characteristics of the data, or by other methods. A flag is then created for the type of data acquired (step 13), to uniquely identify the type of data acquired. The data is then stored in the memory device with the flag indicating its type, any data parameters associated with the data, and the data itself (step 14). A directory may also be created (step 16) listing the types of data that are stored in the memory device, so that an interrogator can be apprised of the data types that are stored in the memory device and the names of those data types.

FIG. 2 is a diagram illustrating an exemplary embodiment of the layout of flags and data from various sensors in an RFID tag. At a given time, the tag records data from a sensor and uses an encoding method to encode a flag that indicates, for example, "what follows is sensor data." In the example shown in FIG. 2, this flag is entitled "Flag_1.1." Optionally, a time stamp (shown as "Time_1" in FIG. 2), GPS location, or other sequential information may be stored with the flagged sensor data (shown as "Data_from_sensor_1" in FIG. 2). Later, another reading from the same sensor (shown as a second occurrence of "Data_from_sensor_1") can be stored on the same tag using another flag (shown as "Flag_1.2") and optionally a time stamp (shown as "Time_2"), GPS location or other sequential information. In the example shown in FIG. 2, data from a second sensor (shown as "Data_from_sensor_2") is recorded at a second time ("Time_2"), but is stored on the tag with a different flag ("Flag_2.1") to indicate that the data came from a different sensor. The flag may be an inherent part of the tag encoding method, an out-of-channel identifier such as extended channel information (ECI) data, a modified function character or a predefined string of ASCII characters, or another type of identifier. The flag and optional sequential information need not be in a series as indicated in the example shown in FIG. 2, but my alternatively be in a grouping where all the flags are stored together in sequence followed by the data elements from the sensor(s), for example.

Figure 3:
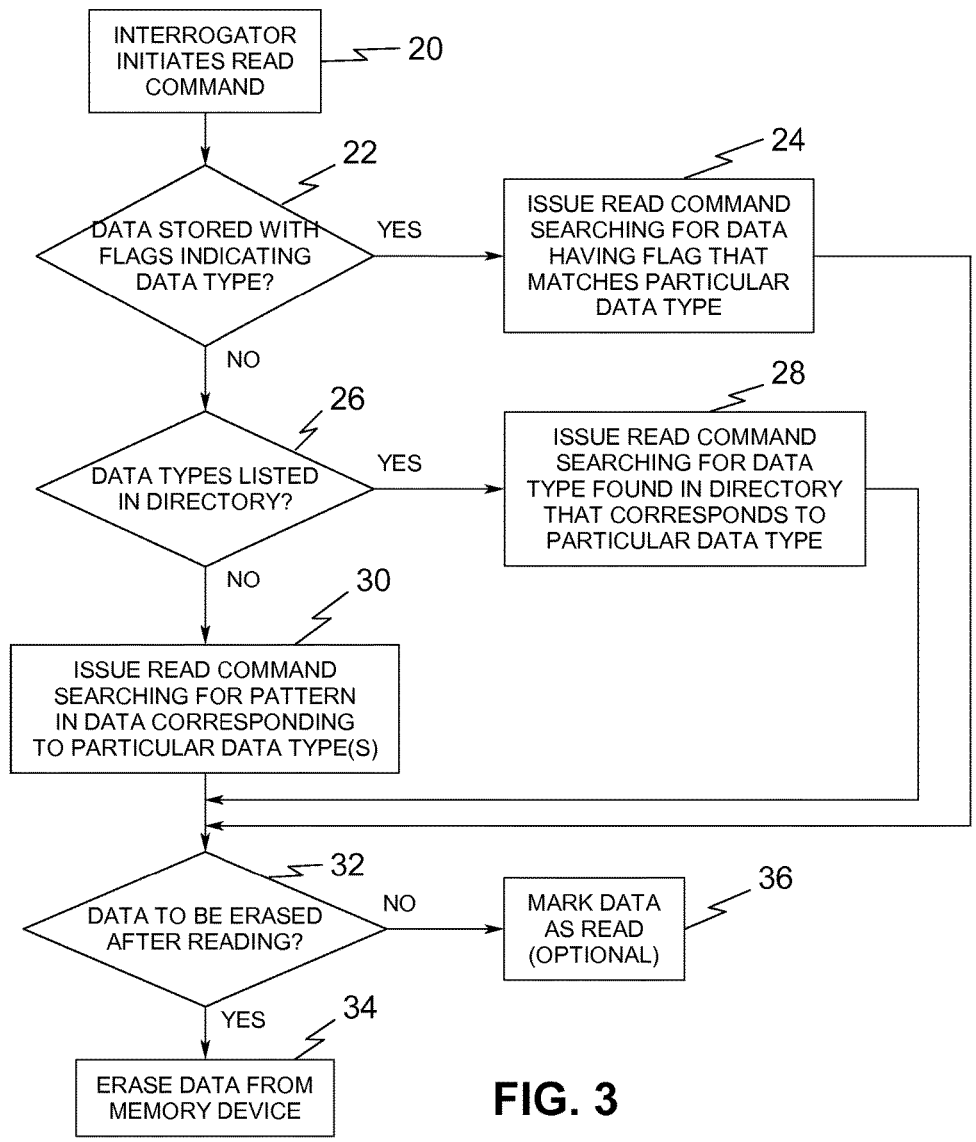
FIG. 3 is a flow diagram illustrating a method of interrogating a memory device in order to selectively read data by data type.

FIG. 3 is a flow diagram illustrating a method of interrogating a memory device in order to selectively acquire data by data type. Initially, an interrogator (such as an RFID reader or another type of device) initiates a read command (step 20). Within the scope of the system and method described herein, there are a number of options for the read command, all involving searching the memory device for an indicator that identifies sensor data. For example, data may be stored with flags indicating the data type, and the interrogator may know what the flags are (indicated by decision step 22). If the interrogator knows the flags stored in the memory device that indicate data type, then a read command is issued searching for data having a flag that matches the particular data type (i.e., sensor data of some kind) for which the interrogator is looking (step 24). If the interrogator does not already know the flags stored in the memory device, the interrogator next determines whether data types are listed in a directory stored by the memory device (decision step 26). If there is a directory of data types stored in the memory, device, a read command is issued searching for a data type listed in the directory that corresponds to the particular data type for which the interrogator is looking (step 28). If no data types are listed in a directory, the interrogator issues a read command that searches for a data pattern that corresponds to the particular data type for which the interrogator is looking (step 30). After reading data, as indicated by decision step 32, the interrogator may erase the data that was read (step 34) or mark the data as having been read (step 36), indicated by decision step 32.

An example of an application in which the above-described methods may be used will now be described. An RFID network may be employed in which multiple items are present, each item having one or more RFID tags associated therewith. In an exemplary scenario, it is desirable to identify specific sensor data stored in the RFID tags. An interrogator issues read commands to the RFID tags, finding only the data that is needed and returning this data despite the existence of multiple RFID tags that contain data of many varieties. In one embodiment, the read command may access specific sensor data such as "temperature" (matching a flag associated with the data that indicates it is temperature data). In another embodiment, the interrogator may access a directory stored in each RFID tag that contains the types of sensor data that are present on the tag.

The read command may be more complex in some embodiments, accessing particular subsets of sensor data such as "temperature data from May 1 to May 6" for example. The interrogator may issue a read command only to tags that have both temperature and humidity data, for example, and not just one or the other. The interrogator may query tags that have sensor data and have data encoded according to a particular standard, such as ISO or EPCglobal. The interrogator may access only sensor data associated with hazardous material information. Other combinations and variations are also possible.

The system and method described above may be implemented by, or used in conjunction with, the out-of-channel methods disclosed in U.S. Patent Application Publication No. 2008/0011822 A1, which is incorporated by reference herein. For example, the system and method described above may employ an out-of-channel command to capture sensor data and initiate the data acquisition and storage method described in FIG. 1, or may execute an out-of-channel command to store a flag associated with certain data in a separate memory device or portion of the memory device, or may involve a combination or modification of these out-of-channel methods.

The system and method described above allows for the storage of multiple sensor data elements in a single memory device or in multiple memory devices, and allows an interrogator to efficiently sort through sensor data stored in a network of one or more memory devices, such as an RFID network. The storage and interrogation system is able to report the specific data of interest despite the existence of a variety of data types on the one or more memory devices in the network.

Although the present invention has been described with reference to preferred embodiments, workers skilled in the art will recognize that changes may be made in form and detail without departing from the spirit and scope of the invention.

The invention claimed is:

1. A method comprising:
receiving, from an interrogator, a query of data from a sensor that records data about a physical parameter, wherein the data is acquired by an RFID tag, a determination is made as to what category the sensed physical parameter that the sensor recorded is, a flag for the determined category of the data acquired is created, and the data is stored in the RFID tag along with a flag indicating what category the physical parameter that the sensor is recording is, wherein the flag is different for different categories of physical parameters;
searching the RFID tag for the indicator that identifies the category; and
reading the sensor data identified by the indicator from the RFID tag.

2. The method of claim 1, wherein the indicator that identifies the sensor data comprises a flag stored in the RFID tag that identifies certain data stored in the RFID tag as the sensor data.

3. The method of claim 2, wherein searching the RFID tag for the indicator that identifies the sensor data comprises searching for the flag that identifies the sensor data stored in the RFID tag.

4. The method of claim 2, wherein the data stored in the RFID tag includes a directory of data types stored therein, and wherein searching the RFID tag for the indicator that identifies the sensor data comprises searching for a data type in the directory that corresponds to the sensor data.

5. The method of claim 2, wherein the flag stored in the RFID tag is an out-of-channel identifier stored in an out-of-channel portion of the RFID tag separate from the data.

6. The method of claim 1, wherein the indicator that identifies the sensor data comprises a pattern in the data stored in the RFID tag that identifies certain data stored in the RFID tag as the sensor data.

7. The method of claim 1, further comprising a time stamp stored in the RFID tag with the sensor data to identify an acquisition time of the sensor data.

8. The method of claim 1, further comprising GPS location data stored in the RFID tag with the sensor data to identify an acquisition location of the sensor data.

9. The method of claim 1, wherein reading only the sensor data identified by the indicator from the RFID tag comprises accessing only particular subsets of the sensor data stored in the RFID tag based on additional information associated with the sensor data, the additional information being selected from the group consisting of a data type of the sensor data, an acquisition time of the sensor data, an acquisition location of the sensor data, an encoding standard of the sensor data, and warning information associated with the sensor data.

10. A method comprising:
acquiring, by an RFID tag, data from a sensor by recording signals about a sensed physical parameter;
determining what category the sensed physical parameter that the sensor recorded is;

creating a flag for the determined category of the data acquired, wherein the flag is different for different categories of physical parameters; and storing the data in the RFID tag with the flag indicating the category of the sensed physical parameter to allow selective reading of the data from the RFID tag by the category.

11. The method of claim 10, wherein acquiring the data comprises receiving input from an external device.

12. The method of claim 10, wherein acquiring the data comprises employing an out-of-channel command to capture the data from a sensor.

13. The method of claim 10, further comprising:
acquiring at least one data parameter with the data that is related to the data acquired.

14. The method of claim 13, wherein the at least one data parameter includes at least one of an acquisition time, an acquisition location, and warning information.

15. The method of claim 10, wherein determining the category of the physical parameter comprises receiving an indicator with the data when it is acquired that identifies the category.

16. The method of claim 10, wherein determining the category of the data acquired comprises reading a header received before the data is acquired that identifies the category of the data that follows the header.

17. The method of claim 10, wherein determining the category of the data acquired comprises examining the characteristics of the data.

18. The method of claim 10, wherein storing the data in the RFID tag with the flag indicating the category comprises executing an out-of-channel command to store the flag in a separate RFID tag or portion of the RFID tag for certain data.

19. A method comprising:
reading an out-of-channel identifier stored in an out-of-channel portion of a memory device separate and distinguishable from the data stored in the memory device that includes sensor data, the out-of-channel identifier comprising a command executable by a reader to search the memory device for an indicator that identifies a directory of data types, to search the directory of data types for a particular data category that corresponds to the sensor data, and to read the sensor data indicated in the directory of data types from the memory device, wherein the directory lists the types of data that are stored in the memory device; and controlling the reader to execute the command, thereby reading the sensor data indicated in the directory of data types from the memory device.

20. The method of claim 19, wherein reading the sensor data indicated in the directory of data types from the memory device comprises accessing only particular subsets of the sensor data stored in the memory device based on additional information associated with the sensor data, the additional information being selected from the group of a data type of the sensor data, an acquisition time of the sensor data, an acquisition location of the sensor data, an encoding standard of the sensor data, and warning information associated with the sensor data.

21. The method of claim 1, wherein the category of the physical parameter is one of the group of: temperature and humidity.

22. The method of claim 1, wherein the reader searches for a second indicator that identifies a directory of data types, searches the directory of data types for a particular data category that corresponds to the sensor data, and reads the sensor data indicated in the directory of data types, wherein the directory lists the types of data that are stored in the memory device.

* * * * *